Sept. 22, 1959  J. B. GAIDA  2,904,988
POWER DOOR LOCKING SYSTEM
Filed Aug. 8, 1955  2 Sheets-Sheet 1

Inventor
Joseph B. Gaida
By Williamson, Schroeder, Adams & Meyers
Attorneys

Sept. 22, 1959          J. B. GAIDA          2,904,988
POWER DOOR LOCKING SYSTEM
Filed Aug. 8, 1955                        2 Sheets-Sheet 2
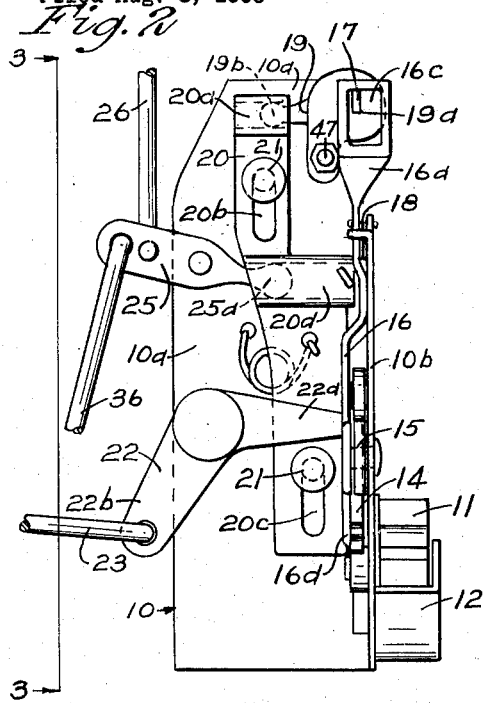
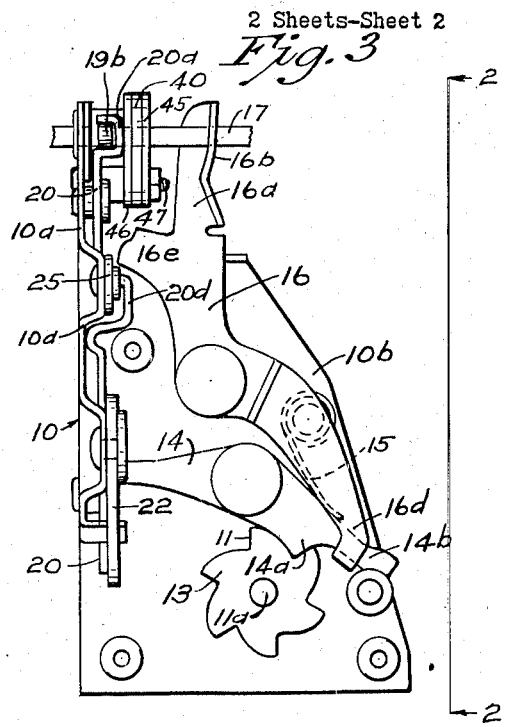
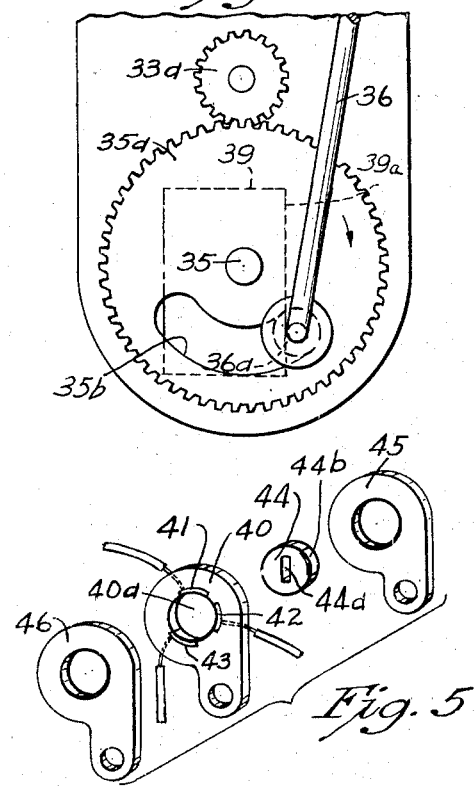
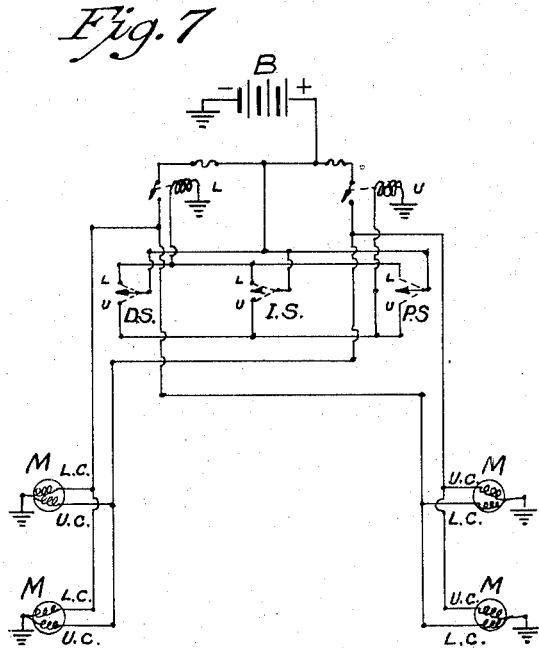
Inventor
Joseph B. Gaida
Williamson, Schroeder, Adams & Meyers
Attorneys

United States Patent Office 2,904,988
Patented Sept. 22, 1959

2,904,988

POWER DOOR LOCKING SYSTEM

Joseph B. Gaida, St. Cloud, Minn.

Application August 8, 1955, Serial No. 527,090

3 Claims. (Cl. 70—264)

This invention relates to a power door locking system for controlling the locking and unlocking of a plurality of doors such as in a motor vehicle.

It is an object of my invention to provide an electrically operated power system whereby all doors of a motor vehicle or analogous multiple door equipment may be simultaneously locked or unlocked through the operation of one or more master switches conveniently located for turning or operation from without the car and preferably including a master switch within the car accessible to the driver.

A further object is the provision of a locking system of the class described wherein the operation of one or preferably both of the key-controlled shafts from the outside of the vehicle (driver's side or passenger's side) controls with a turn in one direction, the locking of all of the car doors and with a turn in the opposite direction, controls and actuates the unlocking of all the doors.

Another object is to provide such a system which coacts with the conventional door locks and latches of most vehicles to enable any or all of the doors to be individually locked or unlocked from the inside of the car by the push-pull rods or the like, but which nevertheless regardless of the number of doors in the car which are manually locked or unlocked, will immediately effect the locking of all doors or the unlocking of all doors through master control mechanism and the employment of novel combined electrical motors and linkage.

It is a still further object to provide a power system of the class described wherein all electrical mechanisms employed are normally de-energized, thus preventing drain upon the vehicle battery and where if the battery is dead, any and all doors may be locked or unlocked mechanically as is accomplished at the present time in motor vehicles, this feature being also important in cases of accident when doors might be jammed or power locks become damaged.

Another object is the provision of such a power door lock system which enables all doors of a motor vehicle to be locked or unlocked with a key on at least one exterior side of the vehicle and which further enables the driver from within the vehicle to lock or unlock all doors simultaneously by operation of an accessible master switch.

These and other objects and advantages of my invention will more fully appear from the following description made in connection with the accompanying drawings wherein like reference characters refer to similar parts throughout the several views and in which:

Fig. 2 is a side elevation on a larger scale of one of the conventional forward door latching and locking mechanism with the upper portion of my power operated linkage operatively installed and the latch and locking means shown in the unlocked position;

Fig. 3 is a front elevation of the same taken approximately along the line 3—3 of Fig. 2;

Fig. 4 is a detail, partial rear elevation showing the lost motion connection and linkage of one of my actuating mechanisms with an electrical motor;

Fig. 5 is an exploded perspective view showing a simple and effective key-controlled switch for exterior operation of the system from one of the key barrels and shafts located in a conventional position either at the passenger's or driver's side of the vehicle;

Figures 1, 6:
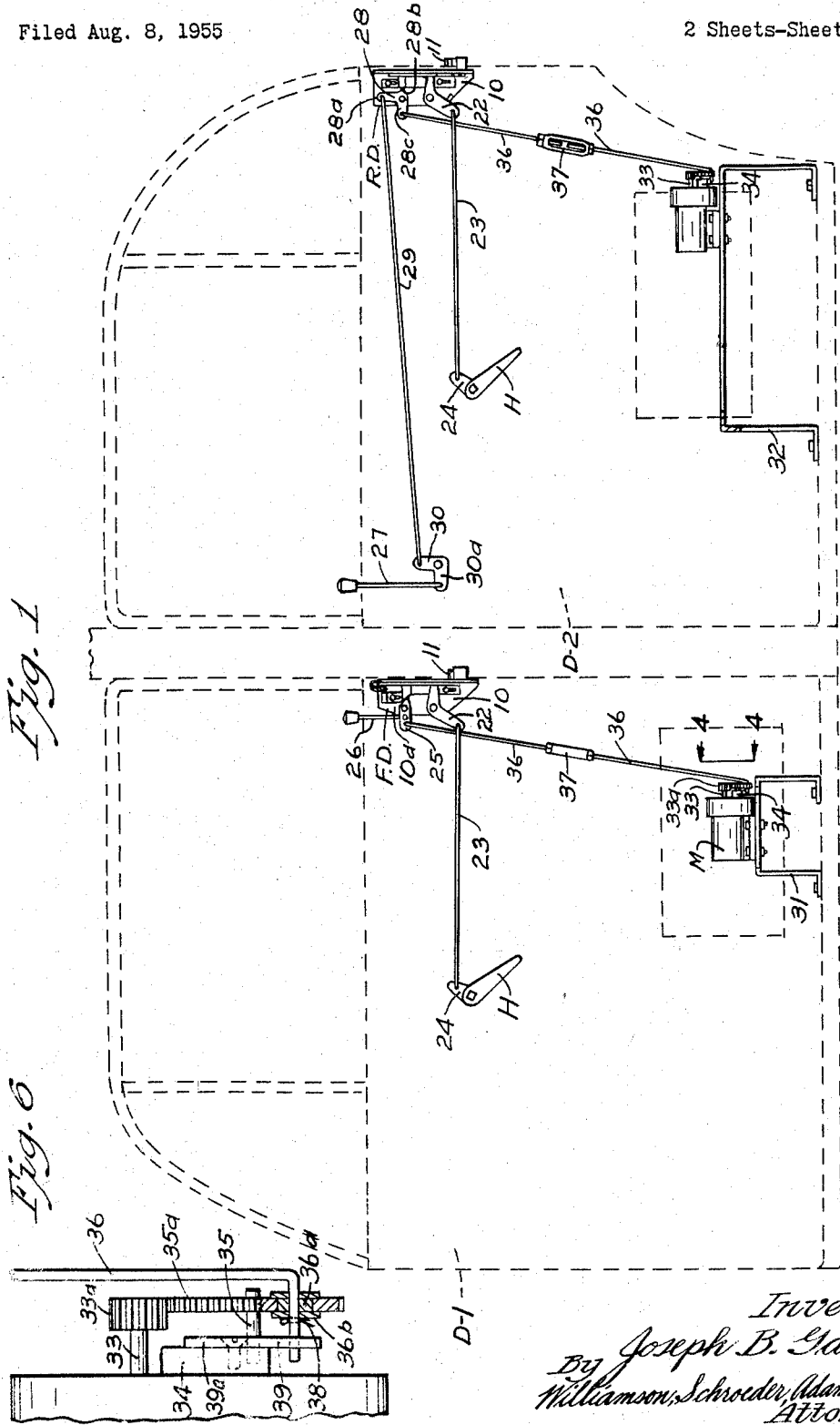
Fig. 1 is a somewhat diagrammatical view illustrating an embodiment of my invention as applied to the doors and conventional door locks and latches of a well known type of pleasure automobile, the outline and certain portions of the front and rear doors and intermediate post being shown in dotted lines.

Fig. 6 is a detail side elevation of the parts shown in Fig. 4 with a portion of the driven gear being broken away and shown in section and illustrating the abutment means for stopping the motor both in the door locking and door unlocking operation; and Fig. 7 is an electrical diagram illustrating an embodiment of my complete circuit wherein master control through relays and selectively through either of the external key-controlled shafts at passenger side or driver side of the vehicle or from a switch accessible to the driver which will control unlocking or locking of all doors simultaneously.

In the embodiment of my power door locking system illustrated, conventional door lock or latch mechanism of manual, push-pull type for the four doors of a pleasure automotive vehicle combine with and form a part of my invention. The said door latch mechanism for the four doors of the vehicle as illustrated, are of the type utilized in the more expensive car models manufactured by Studebaker-Packard Corporation at the present time and as have been manufactured by Packard Motor Car Company during the years 1953 and 1954. A number of other well known makes of motor vehicles such as those made by General Motors Corporation and sold as Buick, and Chevrolet and also, most of the cars manufactured by Ford Motor Company utilize generally similar door latch or locking mechanism.

As shown in Fig. 1, a front door latch mechanism FD is applied to the front driver's door D-1 adjacent the rear and free edge thereof mounted between the outer metal door side and the inner door panel and affixed to the heavy metal flange at the free edge while a generally similar latch mechanism R-D is conventionally secured adjacent the rear and free edge of the rear left door. It will be understood that similar right hand door latch mechanisms (not shown) are secured in conventional manner to the front and rear doors of the vehicle at the passenger's side.

The conventional door latch mechanisms for front and rear doors of the type illustrated are substantially identical with the exception of connection of the push-pull rod and similar and corresponding parts of front and rear mechanisms will be therefore similarly numbered. In each of said latch mechanisms, a vertically disposed, angle mounting plate 10 is employed having an outer flange or web 10a which is secured in parallel relationship within the door panel to the outer door frame or metal and this web has shiftably affixed thereto several working elements to be described. Plate 10 also has the perpendicular or angled wider flange 10b of more or less triangular configuration as shown in Fig. 3 and extending substantially flush with the free edge of the door and secured to the vertical metal channel of the door frame.

At the lower portion of the flange 10b and at the rear side thereof is journaled a latch roller 11 of conventional type in the form of a star wheel, being affixed to a stub shaft 11a which extends through and is journaled in the flange 11b and also in an internal bearing afforded by a shell housing 12 which shields the lower portion of the latch roller. At the inner side of flange 10b a ratchet wheel 13 is affixed to stub shaft 11, said ratchet being normally engaged by the tooth 14a of a lever pawl 14. Said pawl is intermediately pivoted in flange 10b of the mounting plate a short distance above stub shaft 11. Pawl 14 is urged downwardly at its rear end into engagement with ratchet 13 by the free end of a rather heavy torsion spring 15. An elongated push-actuated release lever 16 is also intermediately pivoted to the rear flange 10b of the mounting plate having an upstanding arm 16a which is perpendicularly flanged at one longitudinal edge 16b and which flange is provided with a rectangular opening 16c to accommodate the inner end of the conventional key-bar 17. Release lever 16 has an elongated, lower end provided with a turn or hook 16d which underlies the inner and diminished end 14b of the lever pawl for elevating the same to release ratchet engagement. Release lever 16 is urged in the direction of the door panel by suitable means such as a torsion spring 18 (see Fig. 2). The release lever has a third and shorter arm 16e which serves as a locking abutment when the appropriate push-pull rod is depressed as will later be explained in detail.

A conventional key barrel (not shown) is secured to the outer metal portion of the door at a level aligned with the upper rear corner of the flange 10a of the locking plate and the rotating portion of the barrel in which the key fits is flexibly connected to the key-operated bar 17 which snugly fits into a slot 19a of a shift arm 19 which is pivoted upon the rear upper corner of the flange 10a of the plate. The forward and diminished, rounded end 19b of said shift arm interfits within a transverse channel 20 formed in the upper end of an elongated, vertical shift bar 20 which is mounted for limited vertical shifting upon the appropriate face of plate flange 10a, having adjacent its ends vertical slots 20b and 20c which accommodate headed pins 21 affixed to the plate. Thus, upward swinging of the forward end 19b of the shift arm 19 lifts the vertical shift bar 20 from the position shown in Figs. 2 and 3, thereby interposing a transverse abutment, corrugation or channel 20d against the forward abutment end of the arm 16e of the release lever.

The upper end 16b of the release lever 16 is connected with the release button or handle on the exterior of the door in conventional manner (not shown).

A bell crank lever 22 is pivoted intermediately of plate flange 10a lying substantially in a plane parallel therewith adjacent the forward edge thereof which has a generally horizontal arm 22a overlying the forward end of lever pawl 14 for releasing the pawl, the other arm 22b of said bell crank extending downwardly and being, in the conventional manner, connected by a link 23 with a short arm 24 affixed to the shaft within the door, which shaft is controlled by upward swinging of a handle member H. (See Fig. 1.)

A push-rod-shift-arm 25 is intermediately pivoted adjacent the forward edge and some distance below the upper end of plate flange 10a having a diminished, rounded lift end 25a which projects within the channel 20d to elevate the vertical shift bar 20 when the forward door push-pull rod 26 is depressed and to lower the shift bar when rod 26 is raised. Arm 25 is used in the front door latch mechanism FD since the push rod 26 is conveniently located adjacent the rear edge of the door, but a slightly different mechanism (see Fig. 1) is used for the rear door to shift the rear door vertical shift plate 20 through manual operation of the push-pull rod 27. In the rear doors, a bell crank lever 28 is employed having an upwardly extending arm 28a which is interconnected with a forwardly extending link 29 with a bell crank lever 30 pivoted within the door structure near the forward hinged edge thereof, said bell crank lever 30 having a forwardly extending arm 30a which is in turn connected with the lower end of the guided rear door push rod 27. The bell crank lever 28 for the rear door latch mechanism has a rearwardly extending, diminished lift arm 28b corresponding to lift arm 25a of the front door mechanism which engages the abutment channel 20d of the vertical shift bar for the rear latch.

The previously described mechanisms and cooperating parts are all conventional and standard for the high priced Parkard cars referred to and in general, are common to the other motor vehicles previously enumerated and in combination and co-action with mechanism, I have added, constitute part of my power door locking system.

I provide for each door latch mechanism, a small electrical power source, preferably in the form of a split-phase, reversible electric motor M concealed and mounted within the lower portion of the door structure and operatively connected with the appropriate push-pull shift arms or levers (25 and 28 respectively for front and rear doors); said connection making provision for limiting lost motion through linkage and slot and pin connections hereinafter to be explained in detail. The motors M as shown, are mounted in each instance on narrow strap-pedestals 31 for the front doors and 32 for the rear doors, having as shown, their power take-off shafts 33 extended rearwardly with small gears 33a affixed thereto. The rear end of the motor case in each instance is provided as shown, with a block 34 in which a stub shaft 35 carrying a larger gear 35a is journaled, said gear in each instance being meshed with the small gear 33a on the motor take-off shaft. Each of the gears 35a is provided as shown, with an arcuate slot 35b disposed a short distance inwardly of its periphery and extending concentrically of the gear and of an overall length to provide substantially a quarter turn lost motion connection with the lower connecting rod collar 36a (see Figs. 4 and 6) of an elongated, upwardly extending connecting rod 36. Connecting rod 36 has a turn buckle 37 interposed intermediately thereof to facilitate longitudinal adjustment and has its lower end turned to pass through the associated collar 36a and to also accommodate external spacing washers 36b which retain collar 36a in position and are in turn retained by suitable means such as cotter pins 38. The respective connecting rods 36 are often driven (unless one or more of the push rods 26 are manually operated) after an initial impetus is developed by the motors due to the said lost-motion connection through arcuate slots 35b with the inturned lower ends of the links 36. Under circumstances, as a result of certain relative positions of the slot 35b of gears 35a and rods 36, subsequent to manual operation of the rods, the same are driven immediately as the motors are energized thereby indicating the desirability of employing motors sufficient in power to handle such circumstances. The said lost motion connections always, after power operation of the rods, permit manual operation of the conventional push rod without requiring the turning of the armatures of the motors. The upper ends of the respective connecting rods 36 are turned and the rod for the front door at the turned end connects with the forward arm of the push rod shift arm 25 while the upper turned end of the connecting rod 36 for the rear doors connect with the forward end of an arm 28c of the push rod bell crank lever 28, said arm 28c having been welded or otherwise rigidly secured to the upstanding arm of the bell crank lever 28 supplied by the conventional latch mechanism RD.

To limit upward and downward movement of each of the connecting rods 36 and likewise to stop operation of the associated motor M at appropriate partial revolutions, I have provided an abutment means for the inturned lower ends of connecting rods 36 (see Figs. 4 and 6), as shown, in the form of a vertically mounted plate 39 having a vertical, straight edge 39a which acts as the abutment for both upward and downward strokes of the connecting rods.

Motors M for locking and unlocking the several door latch mechanisms are preferably supplied with electrical energy from the storage battery of the motor vehicle and may be of any reversing D.C. type, as shown, having two windings for the purpose of effecting reversal of operation. All motors it will be noted, may be longitudinally adjusted on their pedestals 31, thereby making provision for various positioning in the installations for proper connection of rods 36 with the respective levers 25 and 28c of the door latch mechanisms.

As shown, two electrical circuits are employed, each controllable by a plurality of master switches whereby any one of said master switches in one position closes the circuit to all motors to simultaneously revolve through a limited number of revolutions in one direction and whereby when any one of said switches is moved to another position, the second circuit is closed through all of said motors causing them to operate for a limited number of revolutions in the reverse direction.

It will of course be understood that my invention is not limited to the three master switches illustrated although I prefer to control power locking and unlocking of all doors through operation of the conventional key barrel at the driver's side of the vehicle as well as at the passenger side of the vehicle and in addition, to perform the same control through a third master switch located on the instrument panel or other place conveniently accessible to the driver. I have provided a simple but highly efficient two-way rotary switch for co-operation with the conventional key-barrel and key-actuated bar utilized by most motor cars.

To this end as shown in detail in Fig. 5, I provide a dielectric central contact-carrying plate 40 having a central circular aperture 40a of a diameter somewhat larger than the width of the key bar 17. Three circumferentially spaced, arcuate metal contacts 41, 42 and 43 are inset in plate 40, their inner surfaces being substantially flush with the cylindrical edge of the plate defining aperture 40a. The intermediate contact 42 is electrically connected by a conductor, as shown, with the battery or other source of electrical energy. The upper of said contacts, 41 as shown, is connected with the circuit for reversing all of the electric motors while the lowermost stationary contact 43 is electrically connected with the circuit for forwardly operating all of said motors. A small disc, movable contact member 44 constructed of di-electric material, is journaled within the apertured portion of plate 40 and has a diametrical slot 44a therethrough for receiving and confining the key bar 17. This disc has inlaid in the peripheral portion thereof, an arcuate metal spanner contact 44b which is adapted to bridge portions of stationary contacts 41 and 42 or portions of stationary contacts 42 and 43 when the key and consequently, key bar 17 is turned in the opposite direction. To retain the disc 44 in place while permitting rotation thereof and to further insulate the switch, I provide as shown, a pair of cover plates 45 and 46 respectively of similar shape to the contact-carrying plate 40 and preferably having circular apertures therethrough slightly less in diameter than the diameter of the movable contact disc 44. Disc 44 is preferably of the same thickness as plate 40. The plates 40, 45 and 46 are secured together as shown in Fig. 3 with the disc 44 journaled in the center plate and receiving in its slot 44a, the key bar 17. The laminated structure described is rigidly held in operative position by a nutted bolt 47 which is secured to the upper portion of flange 10a of the mounting plate.

The arrangement and spacing of the fixed contacts 41, 42 and 43 and the relation of the slot 44a of the movable contact disc with the inlaid arcuate contact 44b, are such that when the conventional door key of the car is inserted in the key barrel, the electrical circuits are not affected, but remain open. When the key with the key bar 17 is turned slightly to the right, the spanning contact 44b of the disc bridges fixed contacts 41 and 42, thereby closing the circuit through the respective windings of the motors, which operates the motors in a direction to turn the larger disc gear 35a in counter-clockwise direction as viewed in Fig. 4, thereby after limited lost motion, pushing upwardly upon all of the respective connecting rods 36 to shift the vertical locking plate 20 downwardly into latch-unlocking position with the abutment channel 20d out of contact with the short abutment arm 16e of the release lever.

Referring now to the dual control circuit which is merely exemplary as shown in Fig. 7, one side of the car battery B is ground to the metal of the frame while the other terminal of the battery is connected in multiple to a pair of locking and unlocking relays L and U respectively. The locking relay L may be energized to close circuits through the locking coils LC of all of the electrical motors M through operation of any one of the master switches DS, PS or IS, as shown in the diagram. Each of said switches are two-way, the switch DS being of the type as illustrated in Fig. 5, key actuated and disposed on the driver's side of the vehicle while the two-way switch PS is similar and key-actuated disposed on the passenger's side exterior of the vehicle. In each instance, when the key inserted in the lock is turned in a forward rotation, directionally of the exterior of the car, all of the electric motors are instantly operated in the locking circuit to unlock the respective latch mechanisms which they service. When the keys of switches DS and PS are rotated rearwardly directionally of the vehicle, then the coils of the respective motors are energized and the motors instantly operated to lock all of the latch mechanisms of the vehicle. The switch IS is disposed within the interior of the vehicle for accessibility to the driver and may be a tumbler or swingable, two-way switch having its spaced, fixed contacts properly connected with the respective relays L and U to produce locking or unlocking revolutions of all of the motors. From the diagram it will be seen that when any one of the master switches DS and IS or PS is operated in one direction from neutral, the locking relay L is energized to close the locking circuits through all of the control motors M, and through the coils LC thereof, where the left and right hand motors turn oppositely but in directions to all pull downwardly upon their respective connecting rods 36. Likewise, when either of said three master switches are thrown in the opposite direction, the unlocking relay U is energized and operated to close the circuit through all of the unlocking coils of the respective power members M, thereby reversing the direction of all motors from that first described and causing upward push upon the respective connecting rods 36 to shift the respective vehicle shift bars 20 downwardly into unlocking positions.

From the foregoing description it will be seen that my power door locking system through electrical power operation simultaneously locks and unlocks all of the doors in a door system such as is utilized in motor vehicles and the like. Operations in both directions by my connecting rods 36 and subsequently, the shift locking bars 20, for all doors are not dependent upon spring bias or solenoid action.

It further will be seen that the doors may all be manually latched, unlatched or locked through the conventional handles, push buttons and pull rods now conventionally utilized while nevertheless regardless of the positioning of push-pull rods at any time, all doors may be power locked or power unlocked through my master switch mechanism and electrical circuits. No change is required in the conventional exterior key barrels and locks to provide for my novel master switches controlled by the conventional key bars at preferably both the driver's side and the passenger's side of the vehicle.

I prefer to provide master switches of my novel design associated with each of the key locks on driver's and passenger's side of the vehicle, together with an inside driver's switch for instantly power locking all doors from within the vehicle. Such interior control of power locking, prevents possible opening of doors during travel around curves and furthermore, provides a measure of safety against hold-ups or forcible entrance of doors by robbers or other criminals at intersections and stop lights. There have been many instances recently where robbery or forcible possession of automobiles was accomplished through entry of an unlocked automobile at stop signals or other places where a car was required to stop in travel.

While the system as electrically connected in the circuit of Fig. 7 provides for simultaneous locking and unlocking of all car doors from any one of the three master switches, it will of course be understood that variations may be made with the same apparatus if desired, such for example having the external key lock for one of the front doors control only power locking of all doors, while the key lock at the opposite side of the car may control power unlocking only of all doors.

It will further be seen that with my system all the electrical mechanisms and components utilized are normally deenergized, thus preventing drain upon the vehicle battery and nevertheless, if the battery is dead, any and all doors may be manually locked and unlocked in the conventional manner utilized at present in motor vehicles.

It will of course be understood that various changes may be made in the form, details, arrangement and proportions of the parts without departing from the scope of my invention.

What I claim is:

1. A power locking system for the conventional latch mechanisms of a plurality of doors, said latch mechanisms being of the type used in the doors of motor vehicles and each of which includes a latch release means and a slidable abutment element for immobilizing and locking said conventional release means, said power locking system comprising for each of said latch mechanisms a single, reversible rotary electrical motor, said motor having associated therewith power-take-off mechanism shiftable from one position to another during forward operation of said motor and reshiftable from the second to the first position upon reversal operations of the motor and longitudinally movable mechanical connection means between said power-take-off mechanism and the slidable abutment element of one of said latch mechanisms and said system including a dual electrical circuit common to all of said motors and including a two-way master switch removed from said motors and key-operated externally of one of said doors and operative when moved in one direction to electrically connect all of said motors to momentarily cause operation thereof in one direction thereby substantially simultaneously shifting the said abutment elements of all of said latches to the immobilizing or locking positions thereof, and when said switch is moved in another direction, to electrically connect all of said motors to momentarily operate the same in a reverse direction, thereby shifting the said abutment elements to release position, said switch being built around the conventional external key-operated lock and release mechanism of an automotive door and including as one of its elements the inwardly extending key-operated bar thereof and further comprising a rotary contact-carrying element affixed to said bar and a stationary contact-carrying element surrounding said rotary contact element and having internal circumferentially spaced contacts thereon.

2. A door-key-operated power locking system for a plurality of doors such as are utilized in a motor vehicle and comprising for each of said doors, latch mechanism comprising a latch member at the end of the door to be locked, means for normally holding said latch member against retraction, manually controlled means for releasing said holding means to enable the door to be opened, and a slidable locking element for immobilizing said release means when shifted to locking position, said power locking system comprising for each of said latch mechanisms, a single reversible electrical motor having associated therewith power-take-off mechanism shiftable from one position to another during forward operation of said motor and reshiftable from the second to the first position upon reverse operation of said motor and longitudinally movable mechanical connection means between each of said power-take-off mechanisms and its associated slidable locking element of a latch mechanism, said system including a dual electrical circuit common to all of said motors and a two-way master switch removed from said motors and built around the conventional external key-operated lock and release mechanism of the said door and including as one of its elements the inwardly extending key-operated bar thereof and further comprising a rotary contact element affixed to said bar and a stationary contact-carrying element surrounding said rotary contact element and having internal circumferentially spaced contacts thereon, whereby when said bar is key-turned in one direction, all of said motors are momentarily energized to cause operation thereof in one direction, and when said bar is key-turned in the opposite direction, said motors are energized to momentarily operate in a reverse direction.

3. The structure set forth in claim 2, wherein said rotary contact element is in the form of a small disc non-rotatably connected with said key-operated bar and having a conductive peripheral sector and wherein said stationary contact-carrying element comprises an annular body of dielectric material surrounding said disc and having three circumferentially spaced conductive contacts internally thereof.

References Cited in the file of this patent

UNITED STATES PATENTS

| | | |
|---|---|---|
| 984,534 | Brookins | Feb. 21, 1911 |
| 1,740,225 | Cummins | Dec. 17, 1929 |
| 2,001,787 | Lakin | May 21, 1935 |
| 2,006,624 | Block | July 2, 1935 |
| 2,061,978 | Pentka | Nov. 24, 1936 |
| 2,505,401 | Ingres et al. | Apr. 25, 1950 |
| 2,653,045 | Pinderhughes | Apr. 25, 1950 |
| 2,703,001 | Shinabery | Mar. 1, 1955 |
| 2,726,534 | Beymer | Dec. 13, 1955 |
| 2,741,503 | Thompson | Apr. 20, 1956 |
| 2,765,647 | Carroll | Oct. 9, 1956 |
| 2,799,154 | Beal | July 16, 1957 |
| 2,852,927 | McCurdy | Sept. 23, 1958 |